US007249206B2

(12) United States Patent
Bilak et al.

(10) Patent No.: US 7,249,206 B2
(45) Date of Patent: *Jul. 24, 2007

(54) DYNAMIC MEMORY ALLOCATION BETWEEN INBOUND AND OUTBOUND BUFFERS IN A PROTOCOL HANDLER

(75) Inventors: Mark R. Bilak, Sandy Hook, CT (US); Robert M. Bunce, Hopewell Junction, NY (US); Steven C. Parker, Wappingers Falls, NY (US); Brian J. Schuh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 10/710,414

(22) Filed: Jul. 8, 2004

(65) Prior Publication Data

US 2004/0233924 A1 Nov. 25, 2004

Related U.S. Application Data

(62) Division of application No. 10/063,018, filed on Mar. 12, 2002, now Pat. No. 6,877,048.

(51) Int. Cl.
*G06F 3/00* (2006.01)
*G06F 12/00* (2006.01)

(52) U.S. Cl. ............ 710/52; 710/53; 710/54; 710/55; 710/56; 710/57; 711/100

(58) Field of Classification Search ............ 710/22, 710/52, 53, 54, 55, 56, 57
See application file for complete search history.

(56) References Cited

U.S. PATENT DOCUMENTS 4,788,697 A 11/1988 Bell et al. .................. 375/113

| | | | |
|---|---|---|---|
| 5,440,546 A | 8/1995 | Bianchini, Jr. et al. ....... 370/60 |
| 5,535,340 A * | 7/1996 | Bell et al. .................. 710/112 |
| 5,602,995 A * | 2/1997 | Hendel et al. ............... 711/209 |
| 5,724,358 A * | 3/1998 | Headrick et al. ........... 370/418 |
| 5,748,629 A * | 5/1998 | Caldara et al. ............. 370/389 |
| 5,881,316 A * | 3/1999 | Chaney et al. ................ 710/56 |
| 5,907,717 A * | 5/1999 | Ellis ............................ 710/56 |
| 5,923,654 A | 7/1999 | Schnell ........................ 370/390 |
| 5,933,435 A * | 8/1999 | Shah et al. .................. 714/749 |
| 6,021,132 A | 2/2000 | Muller et al. ............... 370/412 |
| 6,122,274 A | 9/2000 | Kumar ........................ 370/388 |
| 6,219,728 B1 * | 4/2001 | Yin .............................. 710/52 |
| 6,678,279 B1 * | 1/2004 | Meredith et al. ........... 370/413 |

FOREIGN PATENT DOCUMENTS

WO     WO 00/52955     9/2000

OTHER PUBLICATIONS

IBM Corporation, Packet Switching Module, IBM Technical Disclosure Bulletin, vol. 32, No. 10B, Mar. 1990.
IBM Corporation, Frame Handler with Dynamic Allocation of Buffer Space, IBM Technical Disclosure Bulletin, vol. 32, No. 6B, Mar. 1989.

* cited by examiner

*Primary Examiner*—Mano Padmanabhan
*Assistant Examiner*—Alan S. Chen
(74) *Attorney, Agent, or Firm*—Michael J. LeStrange; Greenblum & Bernstein, P.L.C.

(57) ABSTRACT

An apparatus and method for dynamically allocating memory between inbound and outbound paths of a networking protocol handler so as to optimize the ratio of a given amount of memory between the inbound and outbound buffers is presented. Dedicated but sharable buffer memory is provided for both the inbound and outbound processors of a computer network. Buffer memory is managed so as to dynamically alter what portion of memory is used to receive and store incoming data packets or to transmit outgoing data packets. Use of the present invention reduces throttling of data rate transmissions and other memory access bottlenecks associated with conventional fixed-memory network systems.

3 Claims, 5 Drawing Sheets

DYNAMIC MEMORY ALLOCATION BETWEEN INBOUND AND OUTBOUND BUFFERS IN A PROTOCOL HANDLER

CROSS REFERENCE TO RELATED APPLICATIONS

This application is a divisional application of U.S. patent application Ser. No. 10/063,018, filed Mar. 12, 2002, now U.S. Pat. No. 6,877,048.

BACKGROUND OF INVENTION

1. Field of the Invention

The present invention generally relates to the field of dynamic memory allocation in a networking protocol handler, and, more particularly, to a method and apparatus for dynamically allocating memory between inbound and outbound paths of a protocol handler so as to optimize the ratio of a given amount of memory between the inbound and outbound memory buffers.

2. Background Description

Computer networks are based on the linking of two or more computers for sharing files and resources or for otherwise enabling communications and data transfer between the computers. The computers, often referred to as network nodes, are coupled together through various hardware network devices that allow data to be received, stored and then sent out across the network. Apart from the computers themselves, examples of such network devices requiring the ability to transfer data include controllers, bridges, switches and routers. The foregoing also applies to virtually any addressable point on a network and, in particular, to other devices connected to the network containing microcontrollers (e.g., printers, storage devices).

Because the data communications cannot occur instantaneously and/or because it is often desirable to control the data transfer, memory buffers are used for receiving, storing and sending the data to/from the network node. Memory buffers are essentially temporary memory locations that are used in the process of forwarding data to/from an input port from/to an output port. Requirements placed on the memory buffers increase when the network system employs bi-directional communications and when the inbound and outbound processing of data is simultaneous (i.e., full-duplex). Transfer of data into or out of the memory buffers is performed according to certain networking protocols. Such networking protocols employ flow control algorithms to ensure the transmitting station does not overwhelm the receiving node with data. The same is true for controlling the flow of data out of the network node.

The traditional approach for memory buffers includes an inbound buffer and an outbound buffer for receiving, storing and sending data packets (also referred to as "data frames"). One common buffer can also be used for both incoming and outgoing data transmission, provided the data input/output is not simultaneous. In any event, a certain amount of buffer memory is dedicated to receiving data into the network node (the inbound buffer) and to sending data out of the network node (the outbound buffer).

The advantage of using a common buffer is that the amount of space dedicated to the inbound versus the outbound paths can be easily configured through register programming when initializing the hardware. The drawback is that there is access contention to the memory buffer between the inbound and outbound paths that can result in significant performance degradation when simultaneously processing inbound and outbound frames. Also, for maximum performance the memory buffer access bandwidth must match the combined bandwidth of the inbound network link, the outbound network link, the inbound host interface, the outbound host interface, and any processing overhead. With modern network link speeds well in excess of 100 Mbytes/sec and host bus speeds even greater this may require wide memory data paths and large FIFO's on the network side. Separating the memory into inbound and outbound buffers improves performance by reducing the memory access contention but forces the ratio of inbound to outbound buffer space to be fixed at design time. A method for combining the advantages of both of these options is needed.

The proper allocation of memory between the inbound and outbound buffers for receiving or sending data packets is always a consideration for controller (protocol handler) designers. Though increased buffer space equates to better performance, over-allocating buffer memory results in higher costs. Unfortunately, however, there are many application-dependent factors that impact the memory requirements for a protocol handler. These include the average size of the data packets and the ratio of inbound to outbound traffic seen by the protocol handler. Also, the system requirements will differ depending upon whether the network is primarily an originator or a responder. As a result, for a given amount of memory, designers cannot optimize the ratio of inbound to outbound memory at the design stage.

When buffer space is underutilized in a particular application a potential cost savings is not realized. When buffer space is insufficient the result is a loss of system performance due to the throttling of the frame rate (flow control) on the network. In the case of the outbound buffer being too small the frame transmission rate is limited by the sending node. When the inbound buffer is too small it is the receiving node which limits the rate. Also, depending on the type of network, there may be overhead associated with the flow control mechanism to relinquish and rearbitrate for a shared bus.

For some systems, where the traffic on the links is not bi-directional and/or where simultaneous inbound and outbound processing is not required, a single fixed amount of memory would suffice. Such systems include asynchronous transfer mode (ATM) switches where the frame (referred to as a "cell" in ATM terminology) size is fixed and the bandwidth is symmetric, that is the inbound bandwidth is equal to the outbound bandwidth. In these systems inbound cells can be routed to any buffer in a pool of fixed size buffers. From this buffer the cell can be directly routed to the appropriate outbound path with the routing being based on the cell header contents. Such a system is described in PCT patent WO 00/52955 that teaches a method for assigning memory buffer units to a particular input of a network communication device based on port utilization and quality of service goals. In that patent, the system includes a plurality of memory buffers, each divided into several sub-pools, and a buffer allocator is used for allocating buffer units between the sub-pools. The buffer allocator is arranged to operate based on a quality of service parameter and on a utilization value so as to minimize loss of data transmission at the most heavily-utilized input ports. There are several key differences between this system and the one described in the present invention. ATM systems use small fixed size cells so there is no need to perform calculations on free blocks to determine if another cell can be received. Furthermore, flow control is not used, rather, cells are allowed to be dropped when congestion occurs. WO 00/52955 is concerned with minimizing the number of dropped packets during congestion.

Another difference is that ATM switches and routers have symmetric input and output bandwidth requirements. Cells received into a buffer on the inbound path will be transmitted out of the same buffer on the outbound path. In effect, a single buffer resides in both the inbound and the outbound paths so no reallocation of the buffer space is needed. Also, to minimize costs, a design may incorporate a fixed amount of buffer memory that is not dynamically allocable between the inbound and outbound paths. However, such an approach may induce memory access bottlenecks in the traffic flow for certain applications.

In previous network protocol controllers, for example the Agilent HPFC-5166 Tachyon TS PCI to Fibre Channel Controller, separate frame buffers are used for the inbound and outbound paths. In the Tachyon architecture the inbound and outbound FIFO's are sized large enough to also serve as the frame buffers. The inbound FIFO can hold a maximum of four 2K-byte frames and the outbound FIFO can hold one maximum-size frame. The FIFO sizes are fixed and there is no borrowing of excess space by one FIFO from another.

Similarly, the Qlogic ISP2200 contains separate on-chip inbound and outbound frame buffer spaces. These buffers only support one 2112 byte frame payload, however an interface to optional external memory is provided as a means for increasing the buffer space. In this way buffer sizes can be selected at system design time, however there is not way to statically or dynamically partition the available memory between the inbound and outbound paths once the system or card is built. Since network traffic is bursty and unpredictable it is desirable to be able to dynamically repartition the buffer space in response to the changing network traffic.

Each of the aforementioned systems suffers from the same drawback, that is, for a fixed amount of memory, being unable to dynamically allocate memory between the inbound and outbound buffers of a network protocol handler. As a result, memory access bottlenecks occur in data communications and/or memory buffers must be over-designed to accommodate the peak load expected to be seen by the network.

SUMMARY OF INVENTION

The method and apparatus of the present invention overcome the foregoing drawbacks of the traditional network system, including the presence of bottlenecks in data handling. A method and apparatus for performing the method are disclosed to dynamically allocate memory between inbound and outbound paths of a networking protocol handler so as to optimize the ratio of a given amount of memory between the inbound and outbound buffers.

In one aspect of the present invention an apparatus for processing data packets into or out of a computer network includes a first memory buffer for receiving incoming data packets and a second memory buffer for storing and transmitting outgoing data packets. In a preferred embodiment, an inbound and an outbound processor, each having its own dedicated and sharable memory buffer, are used to reduce access contention. However, a single processor can also be used with the present invention if necessary. The apparatus also includes a means for generating the outgoing data packets from the received incoming data packets or via the host system interface. Dynamic allocation of memory is used such that memory can be shared between the inbound and the outbound paths and the dynamic allocation is performed according to the current availability of memory and stored history. Each memory buffer is divided into blocks. The blocks are sized to be smaller than the maximum frame size of the data packet to be processed. This minimizes wasted space and provides an efficient size allocation scheme. The blocks are managed as a free list of blocks or as a linked list of blocks. As data frames are placed into a memory buffer the appropriate number of blocks are removed from the "free list" and as frames leave the memory buffer the blocks are added back to the "free list." This is managed by a processor thread that also determines the amount of "free" space available in each memory buffer based on the number of blocks in the free list. Use of an interprocess communication path ensures that the memory buffers are equally accessible to both the inbound and the outbound processors (and their respective logic).

Memory is dynamically altered by allocating a portion of the inbound memory buffer for future frame reception and the outbound memory buffer for future frame transmission. Thereafter, a portion of the allocated memory is reserved for data frame reception or transmission. Once the data frame is processed, any allocated memory is deallocated for use in another transaction.

Using the present invention helps to reduce the need to throttle data rate transmissions and other memory access bottlenecks associated with data transfer into and out of computer networks.

In another aspect of the present invention, a method is provided to perform the processing of data packets employing the apparatus of the present invention. Steps to perform this method include receiving incoming data packets into a first memory buffer, generating outgoing data packets and transmitting the outgoing data packets using a second memory buffer. As before, the first and second memory buffers are dedicated to an inbound processor and an outbound processor, respectively, however, there is no restriction against using a single processor. Memory in each buffer is sharable using dynamic memory allocation that is performed according to the current availability of memory and stored history. Dividing each memory buffer into blocks that are smaller than the maximum data frame size being processed provides an efficient memory management scheme. The method manages the blocks as a free list or a linked list of blocks, and the blocks are removed from or added to the "free list" as data frames are moved into and out of the memory buffers. A processor thread that monitors the "free" space available in each memory buffer performs this management task. Each memory buffer is equally accessible to the inbound and the outbound processors through use of an interprocess communication path. Portions of the inbound and the outbound memory buffers are allocated for future frame reception and frame transmission, respectively, after which a portion of the allocated memory is reserved to complete the transaction. Any allocated memory remaining after the data frame is processed is then deallocated for another use.

BRIEF DESCRIPTION OF DRAWINGS

The foregoing and other objects, aspects and advantages will be better understood from the following detailed description of a preferred embodiment of the invention with reference to the drawings, in which.

DETAILED DESCRIPTION

Figure 1:
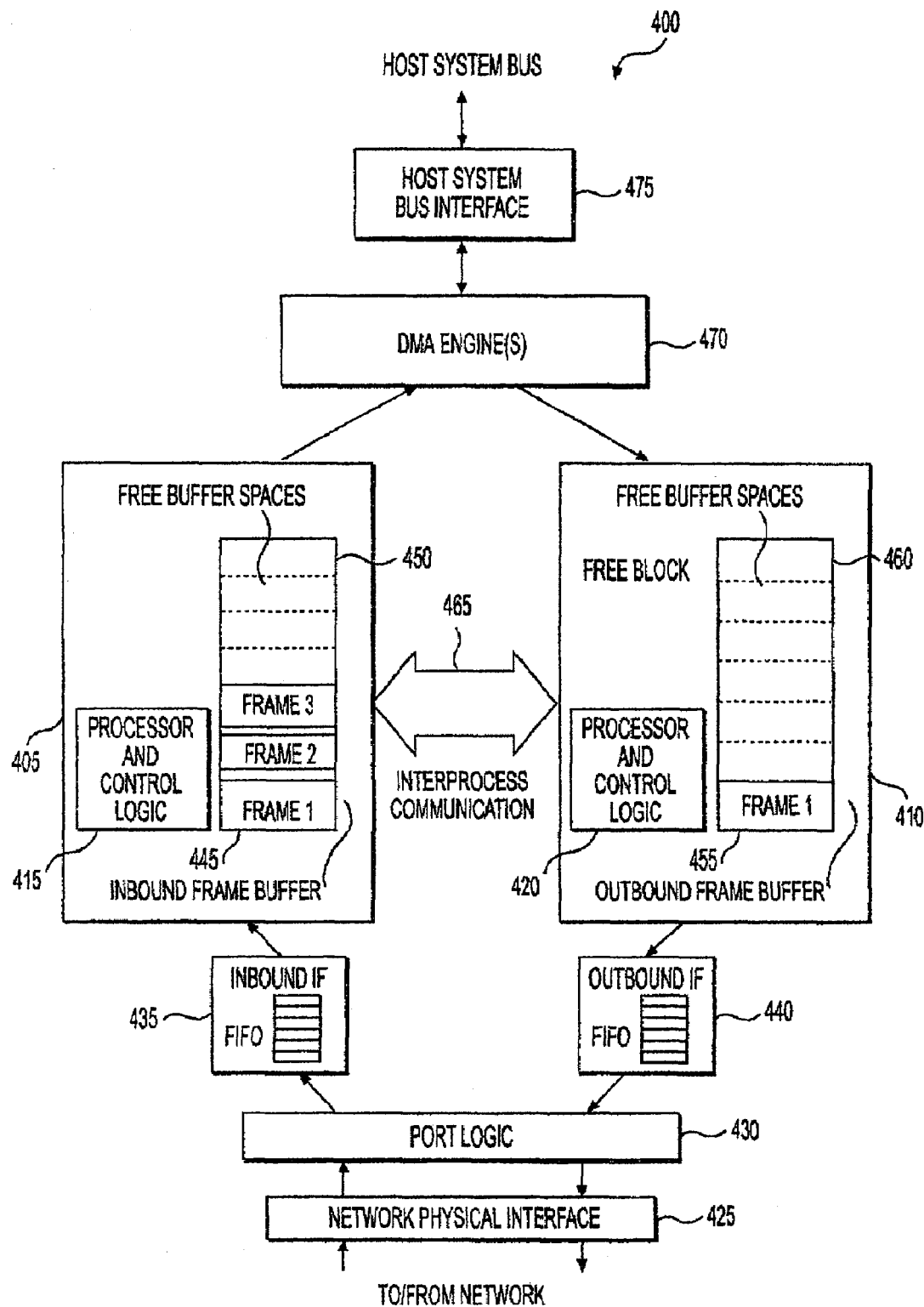
FIG. 1 illustrates the data flow for the link interface of a network protocol handler in conventional systems.

The present invention is directed to a method and apparatus for dynamic memory allocation in a networking protocol handler. In particular, the present invention provides dynamic allocating of memory between inbound and outbound paths of a protocol handler to provide an optimal ratio of a given amount of memory between the inbound and outbound buffers.

Data communication within a computer network involves the sharing and/or transfer of information between two or more computers, known as network stations or nodes that are linked together. The idea of dynamically allocating memory within such a computer network can be generalized to apply to a variety of systems, such as controllers, bridges, routers and other network devices. These systems share the feature that traffic on the network links (i.e., incoming and outgoing data) is bi-directional and inbound and outbound processing of data is simultaneous. Otherwise, a single memory unit would suffice. Examples of such systems include Fibre Channel (FC), Infiniband Architecture (IBA), Ethernet, etc.

Because data transfer into or out of a computer network cannot occur instantaneously, memory buffers are used to provide the ability to receive, store and send data to/from a computer network. Memory buffers are also used in situations where it is desirable to control the data communications. In any event, data transferred into or out of the network is accomplished using networking protocols according to flow control algorithms. These algorithms ensure that data coming from the transmitting station does not overload the receiving station. The inbound and outbound memory buffers can be software- or hardware-managed, though the preferred embodiment of the present invention uses software management because of the complexity of a hardware-managed implementation. A preferred embodiment uses separate memory for the inbound and outbound buffers to eliminate memory access bottlenecks, however, a single partitioned memory can be used so tong as the inbound and outbound buffers are in the same address space (i.e., the inbound logic can access the outbound buffers and the outbound logic can access the inbound buffers). Link level flow control is required and must be dynamically changeable. For example, FC uses incremental buffer-to-buffer credit (BB_Credit) and IBA uses flow control packets or frames to meet this requirement. To determine optimum allocation of memory, it is necessary to monitor relative usage of the inbound and outbound buffer spaces. In a preferred embodiment of the present invention, a processing thread is used to monitor the minimum number of blocks (as defined below) of free space reached during some time period for both the inbound and the outbound buffer frames. Similarly, the allocation of space between the inbound and outbound buffers can be provided, in a preferred embodiment, using a processing thread to move blocks of data from one linked list or free list to another.

Using the apparatus and method of the present invention, the ratio of memory between the inbound and the outbound memory buffer can be optimized, for a fixed amount of memory, through dynamic memory allocation.

Referring now to the drawings the apparatus and method of the present invention will be described. First, FIG. 1 depicts the data flow scenario 400 into and out of a computer network using conventional techniques. In this figure a separate inbound buffer 450 and outbound buffer 460 are used to avoid memory access contention because the interface is full duplex. Each of these buffers represents a pool of buffer spaces which are generally sized to fit a maximum frame size. The controller has to perform a set of tasks that taken together are complex enough to usually require one or more processors although full hardware implementations are also possible. These tasks include managing the buffers, handling errors, responding to inbound frames in a protocol dependent way, frame reordering, relating frames to particular operations and updating the status of the operation, and controlling the DMA engines 470 that move data from the buffers to or from host system memory across the host system bus. In the example of FIG. 1 separate processors are used to handle the inbound and outbound paths. The memory buffers 450 and 460 are assigned to the inbound processor 415 and to the outbound processor 420, respectively. A network physical interface 425, operating via port logic 430, communicates with an inbound FIFO 435 and an outbound FIFO 440. The inbound path 405 receives data from the inbound FIFO 435, and the outbound path 410 sends data to the outbound FIFO 440. The inbound buffer 450 accommodates various-sized data frames (or packets) 445, which leaves a certain amount of free buffer spaces available to handle additional incoming data. Similarly, the outbound buffer 460 contains outgoing data frames 455 and a certain amount of free buffer spaces. An interprocess communication path 465 provides each processor 415 and 420 with information as to the amount of free space in the inbound and outbound frame buffers 450 and 460 and provides access to the other path's buffer. However, since the conventional systems do not allow transfer of available free blocks from the outbound buffer to the inbound buffer (or vice versa), data transfer can become stalled if the inbound or outbound buffers become full.

Continuing with the description of FIG. 1, one or more DMA engines 470 is used to transfer data into or out of the memory buffers to or from host system memory across the host system bus interface 475.

Figure 2:
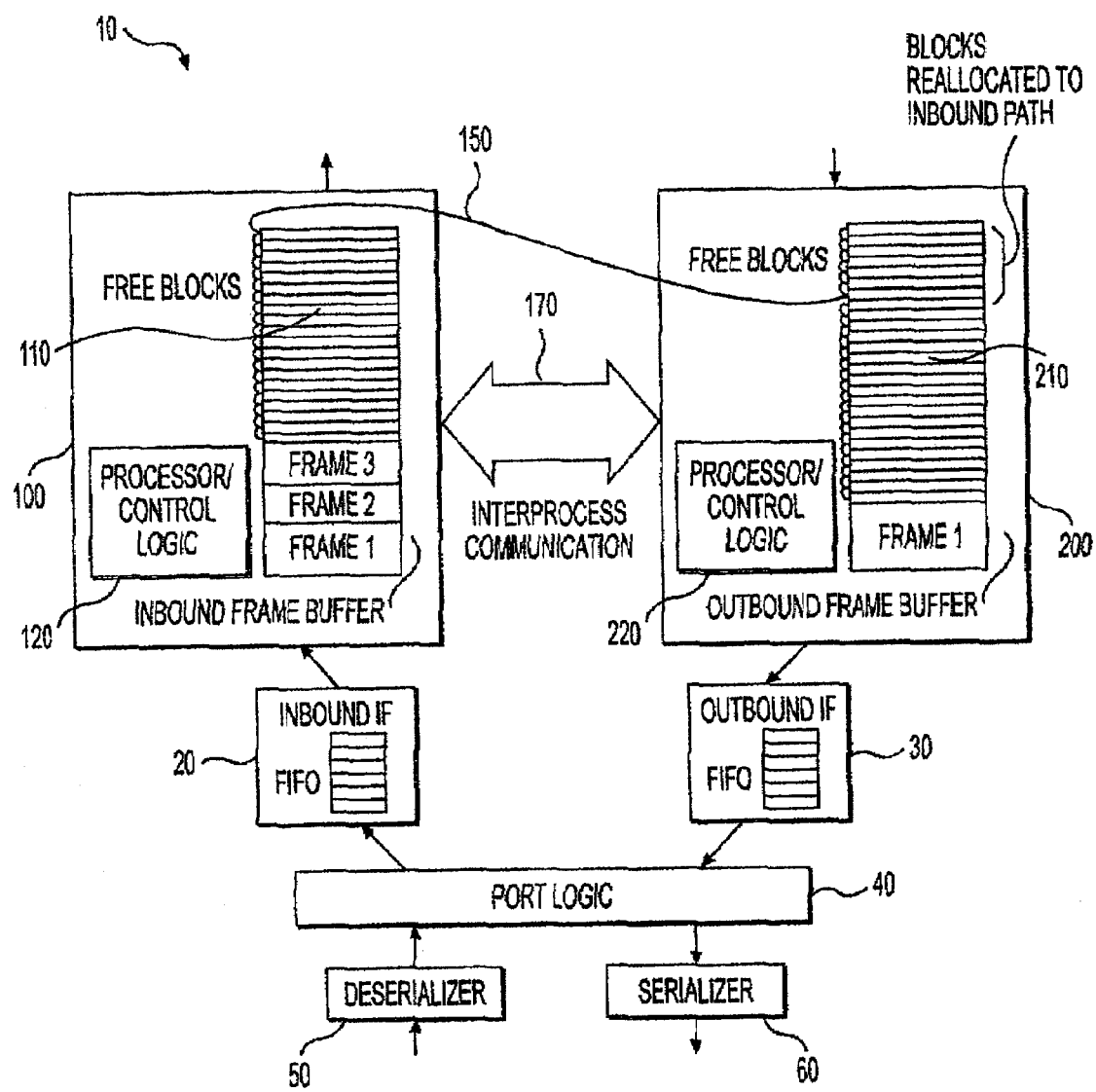
FIG. 2 depicts the data flow for the link interface of a network protocol handler using dynamic reallocation of memory from the outbound frame buffer to the inbound frame buffer by the apparatus and method of the present invention.

In a preferred embodiment, by way of example only, FIG. 2 depicts a data flow scenario 10 for the link interface of a network protocol handler using the features provided by the present invention. In FIG. 2 there are two separate processors, namely, an inbound processor 120 and an outbound processor 220; however, two processors is not a requirement for the present invention. The inbound processor 120 receives data from an inbound FIFO 20, and the outbound processor 220 sends data to an outbound FIFO 30. Using an FC controller as an example, the network physical interface becomes a serializer 60 and deserializer 50. The port logic 40 will contain all the functions that must happen at hardware rates. Again, in the FC case this would include error checking, frame validation, CRC checking, 8B10B encoders and decoders, and elasticity FIFO's to handle slight clock differences between the received data rate and the local clock rate. The inbound and outbound FIFO's are used since the frame transmission rate on the network cannot be interrupted but there is not a dedicated bandwidth into or out of the frame buffers. The FIFO's are sized to accommodate the small interruptions of data transfer into or out of the frame buffers. The blocks in FIG. 2 that contain the FIFO's also contain the interface logic to the frame buffer and control blocks.

Continuing with FIG. 2, each processor, 120 and 220, is assigned its own memory buffer, namely, an inbound frame buffer 100 and an outbound frame buffer 200, respectively. These memory buffers are used as the processing space for inbound and outbound frames. Should either of the dedicated buffers become overloaded, the present invention allows for "borrowing" blocks of memory by one buffer from another buffer so as to avoid throttling of the data rate into or out of the network. For efficiency and to minimize wasted space, each frame buffer 100 and 200 is divided into blocks 110 and 210 that are smaller than the maximum frame size. These are managed as a list of blocks in a free list or as a link 150 in a linked list of blocks. As data frames are placed into the memory buffer to be processed (e.g., Frame 1, Frame 2, Frame 3 in the Inbound Frame Buffer 100) the appropriate number of blocks are removed from the "free" list of blocks. Similarly, as data frames leave the memory buffer where they are stored in system memory via DMA (e.g., Frame 1 in the Inbound Frame Buffer 100) the appropriate number of blocks are added back to the "free" list of blocks. The free list blocks are managed by a processor thread 120 that can also easily calculate the amount of free space in the buffers based on the number of free blocks in the free list. Further, through the interprocess communication path 170 the inbound and outbound frame buffers 100 and 200 are equally accessible to both processors 120 and 220 and to the inbound FIFO 20 and outbound FIFO 30 (although possibly with a higher access latency that requires more clock cycles to access data).

As an example, in an FC protocol handler, and considering only the data payloads which are a maximum of 2112 bytes, for a block size of 256 bytes the inbound and outbound buffer sizes would be 64 blocks or 16384 bytes each. In that case the inbound buffer 100 can hold seven (7) full-size payloads so that up to seven (7) flow control "primitives" (R_RDY's) can be issued. A "primitive" is defined in the FC specification as a 4-byte control word. The advantage of using smaller block sizes is realized when data payloads that are smaller than the maximum are received. So, for example, if three (3) 512-byte payloads were received, then there would be 58 blocks remaining free that can still hold seven (7) full-size payloads. This would allow the sending of three (3) more R_RDY's even before the received frames are processed.

Continuing with this example, suppose that the processor thread 120 determines that the inbound frame buffer 100 is normally nearly full, causing a throttling of the frame reception rate using the flow control mechanism (i.e., the R_RDY's). As a result, if the outbound frame buffer 200 also normally has free space (as depicted in FIG. 2), then some of this space can be dynamically removed from the outbound free list and added to the inbound free list. The result of this dynamic memory allocation is as shown in FIG. 2. This will then allow more R_RDY's to be issued. The converse to the above procedure is also true when the outbound frame buffer 200 is normally full and the inbound frame buffer 100 is underutilized.

Figure 3:
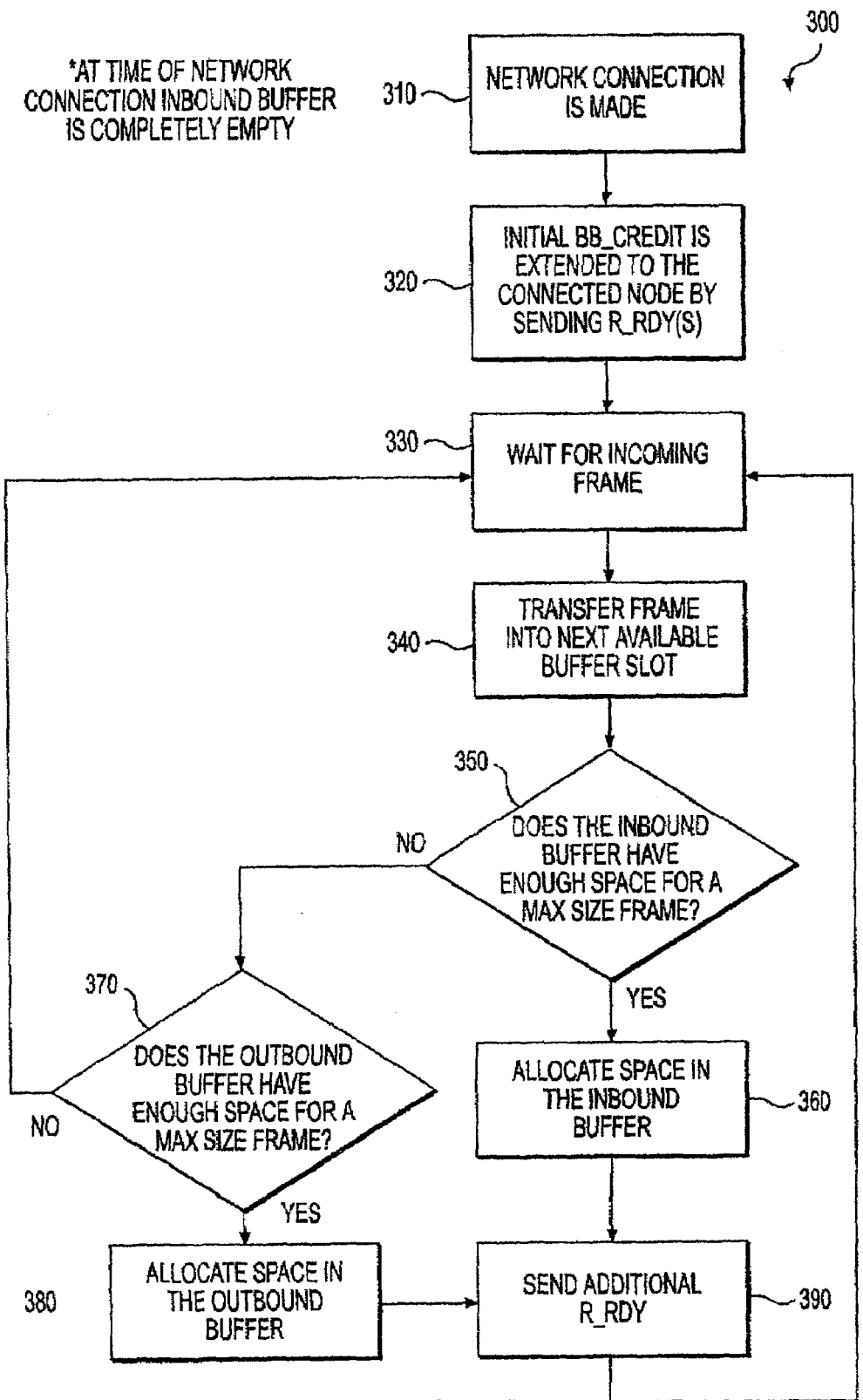
FIG. 3 contains a block diagram depicting the dynamic memory allocation process for the inbound flow.

FIG. 3 describes in block diagram form the dynamic memory allocation process 300 for the inbound flow of data using the inbound frame buffer 100. Analogous diagrams for the deallocation process and the outbound flow are presented in FIGS. 4 and 5, respectively. Each of these is directed towards use of FC control, though other processes are equally applicable.

The inbound frame allocation process 300 begins by making a network connection 310. Note that the inbound frame buffer is completely empty at the time the network connection is made. After the network node is connected, an initial buffer-to-buffer credit (BB_credit) is extended by sending request for data transmission through one or more R_RDY's 320. Thereafter, the inbound frame buffer waits for an incoming data frame 330 and, when it arrives, transfers the frame into the next available buffer slot 340. At that point the process tests to determine if the inbound frame buffer has sufficient space for a max-size frame 350 (e.g., 2112 bytes for an FC frame). If the answer to the test 350 is "yes," then space is allocated in the inbound frame buffer 360 to accommodate the data frame. However, if the answer to the test 350 is "no," then another test is performed to determine if there is sufficient space in the outbound frame buffer to accommodate a max-size frame 370. If the answer to this test 370 is "no," then an additional R_RDY cannot be sent until enough buffer space is freed up by processing frames as in FIG. 4, so the process returns to step 330 and awaits another incoming frame. On the other hand, if the answer to the test 370 is "yes," then space is allocated (reserved) in the outbound frame buffer 380. The result of either of steps 360 or 380 is that an additional R_RDY can be issued 390 and then the process again returns to step 330.

Figure 4:
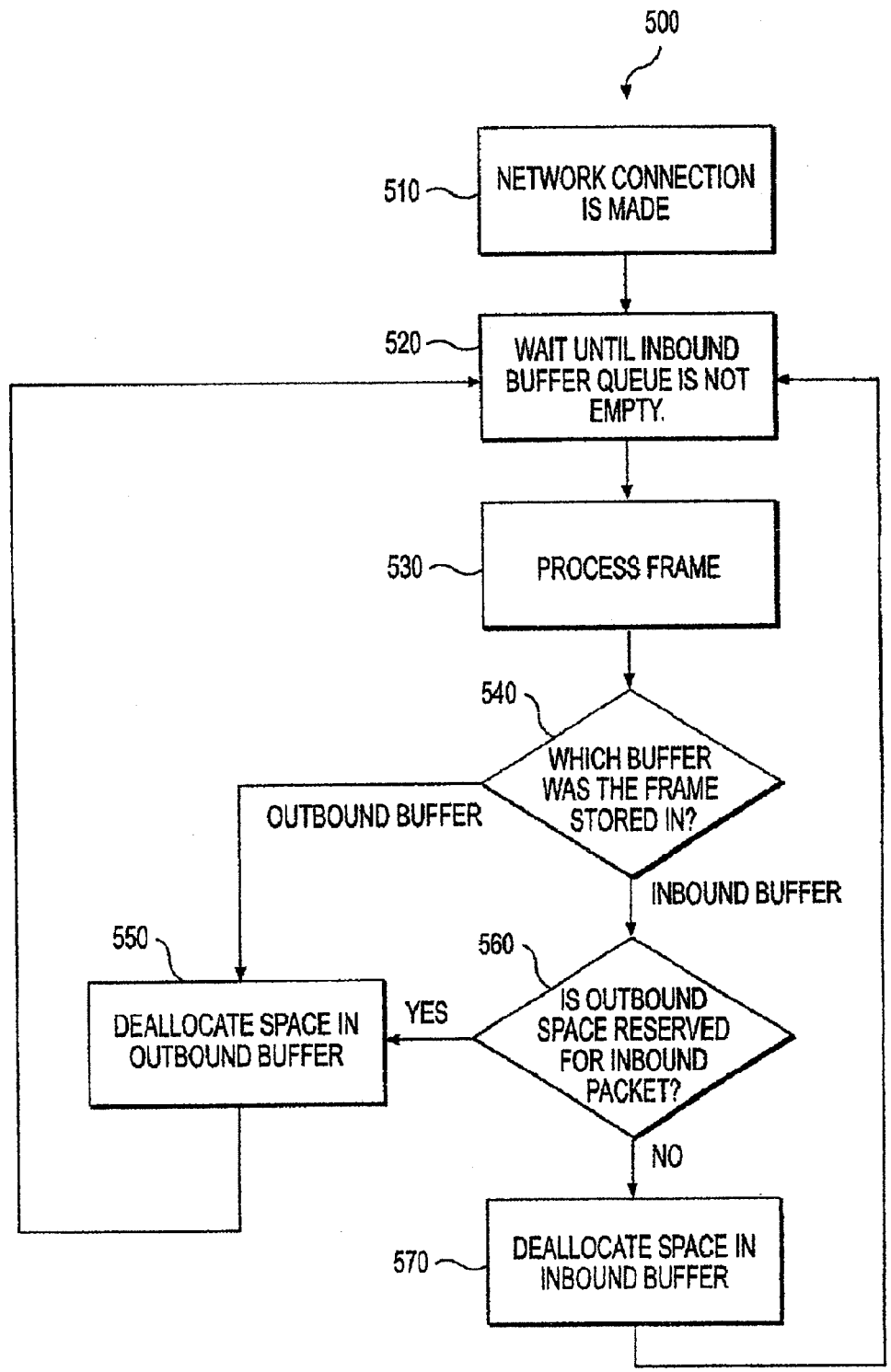
FIG. 4 contains a block diagram depicting the deallocation of memory for the inbound flow.

In FIG. 4, the process for deallocating memory for the inbound frame buffer 500 is depicted in block diagram form. Again, the process begins by establishing a network connection 510. After the connection with the network node is established, the process waits until such time as the inbound buffer queue is not empty 520 and then processes frame 530. Next, a test is performed to determine in which buffer the data frame was stored 540 (i.e., in the inbound frame buffer or in the outbound frame buffer). If the answer to the test 540 is the "outbound frame buffer," then the amount of space that was taken up by the processed data frame 530 is deallocated in the outbound frame buffer 550. Thereafter, the process returns to step 520 to begin the processing of another frame 530. Alternatively, if the answer to the test 540 is the "inbound frame buffer," then an additional test is performed to determine if the outbound frame buffer is reserved for an inbound data packet 560. When the answer to this test 560 is "yes," then deallocation of the space in the outbound buffer occurs 550. However, if the answer to test 560 is "no," then only the space in the inbound frame buffer is deallocated 570. In either case, the process returns from both step 550 and step 570 to step 520 to await another frame processing request.

Figure 5:
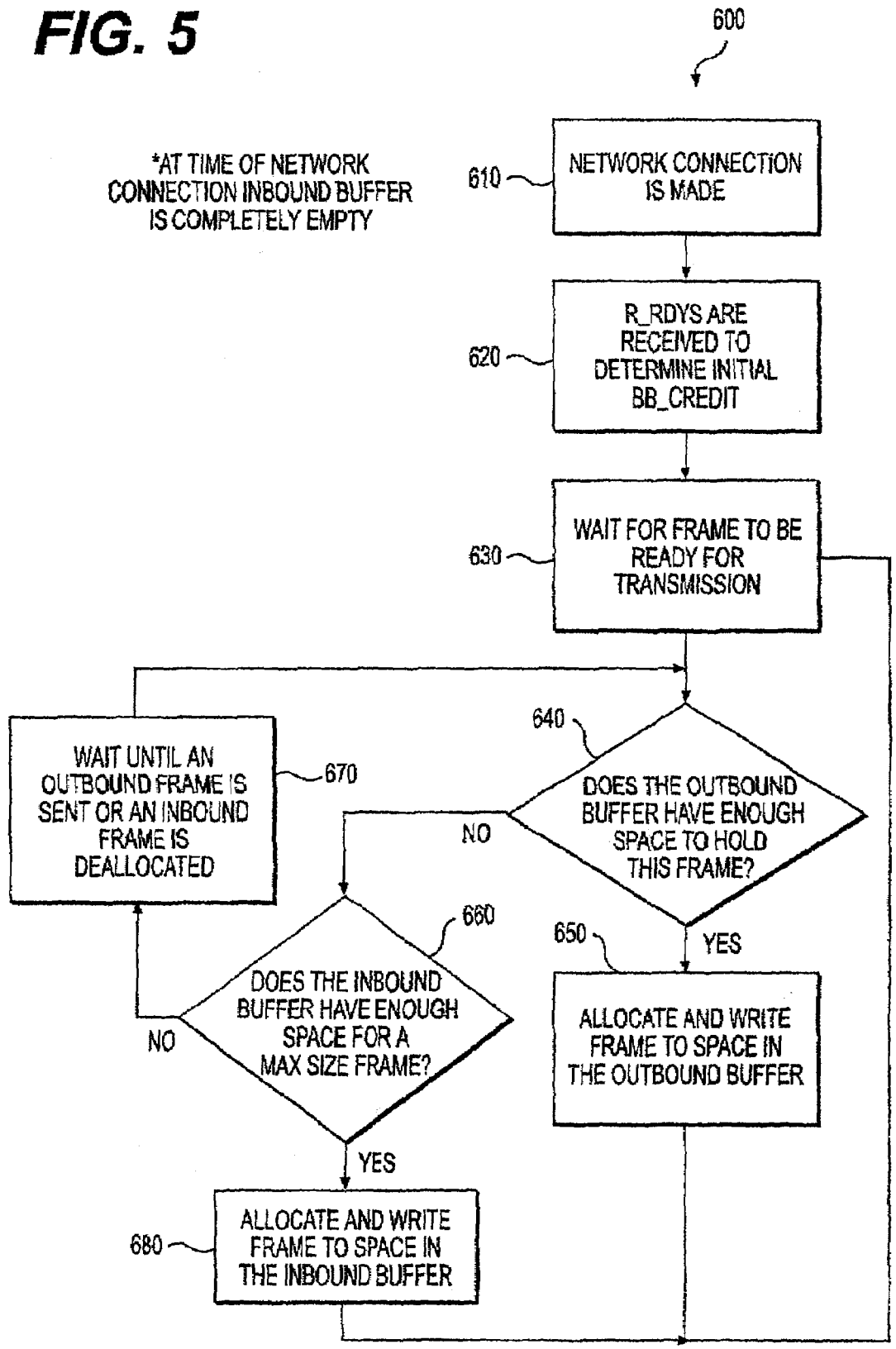
FIG. 5 contains a block diagram depicting the dynamic memory allocation process for the outbound flow.

Continuing with the description of an FC control, FIG. 5 depicts the process for allocation of an outbound frame buffer 600 in block diagram form. Initially a connection to the network node is made 610, but, as before, the outbound frame buffer is completely empty at this time. To determine the initial BB_credit available one or more R_RDY's are issued and received 620. Next, the process waits until the data frame is ready to be transmitted 630. At that point, a test is performed to determine if the outbound frame buffer has adequate space to hold the data frame to be transmitted 640. If so, then the answer to test 640 is "yes," and the data frame is allocated and written to the available space in the outbound frame buffer 650. Thereafter, the process returns to step 630 and waits for another data frame to be transmitted.

However, in the event the answer to test 640 is "no," then a subsequent test is performed to determine if the inbound frame buffer has sufficient space to accommodate a max-size frame 660. If the answer to test 660 is "no," then the process must wait until either an outbound data frame is sent or until an inbound data frame is deallocated 670. Whenever the answer to test 640 is "yes," the process proceeds to step 650 as described above. Alternatively, if there is sufficient space in the inbound frame buffer, then the answer to test 660 is "yes," and the data frame is allocated and written to the available space in the inbound frame buffer 680.

While the invention has been described in terms of preferred embodiments, and specific embodiments by way of example in the drawings are described in detail, it should be understood that the drawings and detailed description thereto are not intended to limit the invention to the particular form disclosed. To the contrary, those skilled in the art will recognize that the present invention can be practiced with modifications, equivalents and alternatives within the spirit and scope of the appended claims.

The invention claimed is:

1. An apparatus for processing packets comprising:
    an inbound memory for receiving data packets;
    an outbound memory for transmitting data packets;
    circuitry capable of dynamically allocating memory from the inbound memory for use by the outbound memory or from the outbound memory for use by the inbound memory;
    a first processor for controlling the inbound memory; and
    a second processor for controlling the outbound memory,
    wherein the first processor controls the receiving of the data packets and processing of the received data packets.

2. The apparatus of claim 1 wherein the outbound memory transmits the processed data packets.

3. The apparatus of claim 2 wherein the first and second processors communicate with one another concerning available memory within the inbound and outbound memories, respectively.

* * * * *